Figures 1, 2:
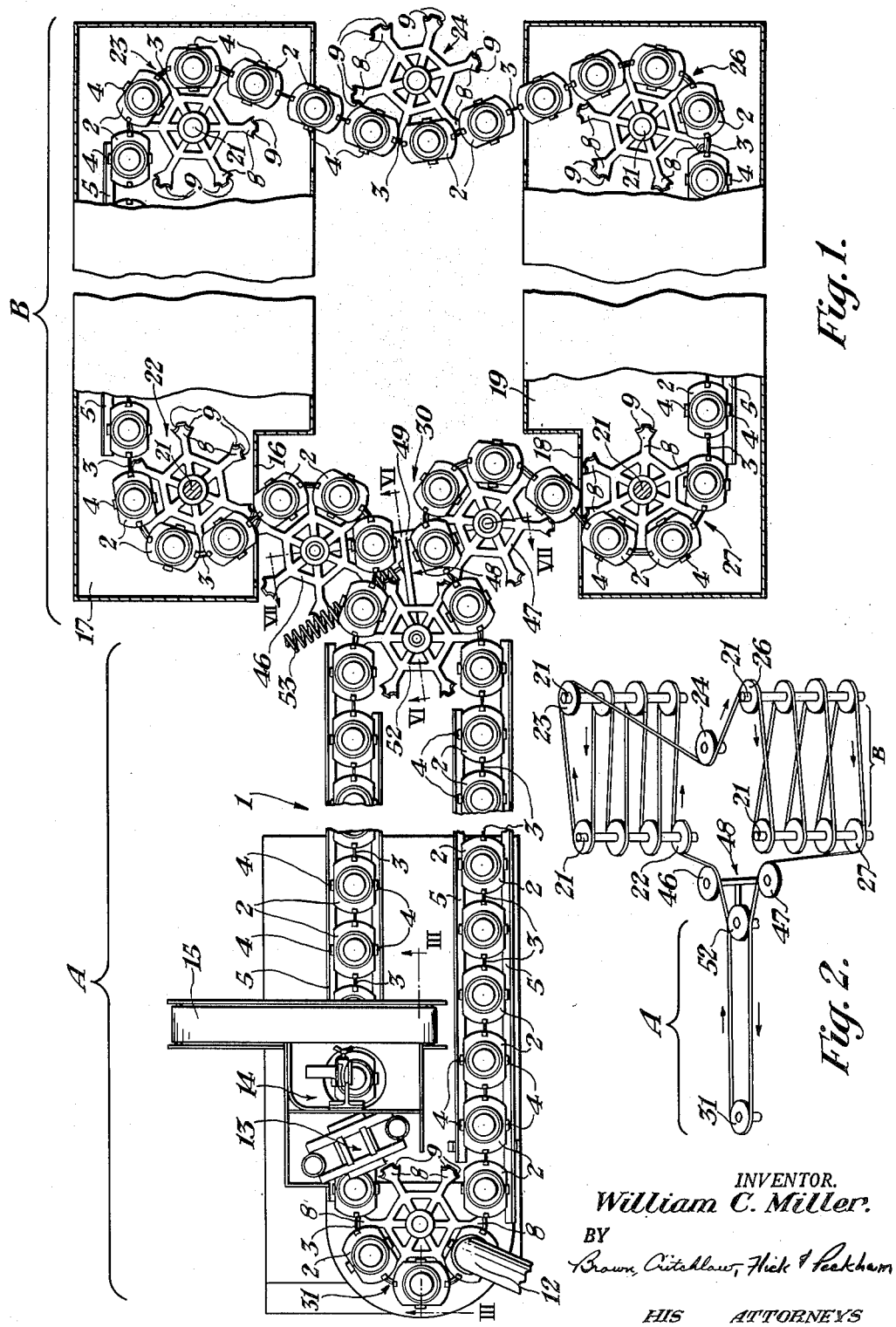

March 9, 1954     W. C. MILLER     2,671,552
INTERRUPTED CONTINUOUS CONVEYER
Filed June 19, 1951                              5 Sheets-Sheet 1

INVENTOR.
William C. Miller.
BY
Brown, Critchlow, Flick & Peckham
HIS ATTORNEYS

INVENTOR.
William C. Miller.
BY
Brown, Critchlow, Flick & Peckham
HIS ATTORNEYS

March 9, 1954 — W. C. MILLER — 2,671,552
INTERRUPTED CONTINUOUS CONVEYER
Filed June 19, 1951 — 5 Sheets-Sheet 3

INVENTOR
William C. Miller.
BY Brown, Critchlow, Flick & Peckham
HIS ATTORNEYS

March 9, 1954 W. C. MILLER 2,671,552
INTERRUPTED CONTINUOUS CONVEYER
Filed June 19, 1951 5 Sheets-Sheet 4

INVENTOR.
William C. Miller.
BY
Brown, Critchlow, Flick & Peckham
HIS ATTORNEYS

March 9, 1954 — W. C. MILLER — 2,671,552
INTERRUPTED CONTINUOUS CONVEYER
Filed June 19, 1951 — 5 Sheets-Sheet 5

INVENTOR.
William C. Miller.
BY
Brown, Critchlow, Flick & Peckham
HIS ATTORNEY

Patented Mar. 9, 1954

2,671,552

UNITED STATES PATENT OFFICE 2,671,552

INTERRUPTED CONTINUOUS CONVEYER

William C. Miller, Pittsburgh, Pa.

Application June 19, 1951, Serial No. 232,353

8 Claims. (Cl. 198—110)

1

This invention relates to endless conveyors and, particularly, to mechanism adapted to permit a portion of the conveyor to move intermittently while the remainder of the conveyor is traveling at a constant rate of speed. It is a continuation-in-part of my application #130,508, filed December 1, 1949, which was abandoned after the filing of this application.

One use of such intermittently moving endless conveyors is in the manufacture of pottery ware, and, although the description will be with reference to such use, it should be understood that the invention is not limited to it. In manufacturing pottery ware, it is desirable to progress the molds intermittently, or step-by-step, through a ware-forming zone, after which the formed ware is carried at a constant rate of speed through a second zone in which it is dried. Such intermittent movement in the ware-forming operation is desirable because of the practical necessity of feeding ware-forming clay batts onto molds while the molds are stopped. Such being the case, advantage can be taken of the arrested conveyor to perform the other ware-forming operations, such as pressing and jiggering, it being understood that suitable actuating mechanism is provided to synchronize all of these operations.

However, it is equally desirable to move the formed ware continuously through the drying zone, the reason for this being that the drying zone is so long that any intermittent moving of the long section of the conveyor passing through it would require excessive power to overcome its inertia each time intermittent motion is resumed. In addition, starting and stopping of such a long conveyor section would result in a jerking motion which might unseat the molds or cause other damage to the ware. Also, the actual drying of the ware would not be uniform since some pieces might be subjected to more frequent halting than others.

Due to these considerations, there have been developed endless conveyors that have both an intermittently and a continuously moving section, although in all such conveyors a problem arises which has not been solved in as satisfactory a manner as could be desired. This problem results from the rather obvious fact that, when the intermittently moving conveyor section is stopped, the continuously driven section of the conveyor creates a pull, or tension, which must be relieved to prevent conveyor breaks. At this same instant, the continuously driven section feeds a length of conveyor toward the intermittently moving zone and this length must be taken

2 up to maintain the conveyor taut. The mechanism normally used to relieve this tension, as well as to take up the slack, has been termed "catenary" mechanism and, generally, it includes a pair of sheaves about which the conveyor passes as the conveyor progresses from the intermittently moving zone to the continuously moving drying zone, or vice versa; these sheaves actually being sprocket wheels, but they will be referred to herein as "sheaves" to clarify description by distinguishing them from the numerous other sprockets used. The sheaves are arranged in such a manner that one of them creates a loop in the conveyor prior to its entry into the continuous zone, and, when the intermittent section of the conveyor is stopped, this sheave is moved to pay out the loop and provide a length of conveyor which can be taken into the continuously driven section. Due to this motion, the tension or pull on the conveyor, which otherwise would be created, is avoided. Also, the other sheave of the pair is disposed so as to move simultaneously and take up the slack fed out of the continuously driven section when the intermittent section is stopped.

Although such catenaries are unobjectionable insofar as their principle of operation is concerned, difficulty has been found in providing simple and inexpensive mechanism to perform the job of synchronously moving the sheaves the amount necessary to relieve the conveyor tension and take up the slack. Such motion has been produced in most cases by cams, or other positively acting mechanical means, and, as readily can be appreciated, such mechanical actuating means are subject to wear, misalignment, faulty adjustments and other causes which may prevent proper operation in that there is introduced either an excessive tension or such a slackness as might cause the conveyor to become disengaged from its driving means.

It is therefore an object of the present invention to provide catenary mechanism for relieving the tension and taking up the slack produced in an endless conveyor having both intermittently and continuously driven sections, the movement of the mechanism being controlled entirely by the amount of tension created in the conveyor so that the linear distance through which the catenary mechanism moves is determined by conveyor tension rather than by any positive mechanical means such as a cam.

Further related objects are to provide catenary mechanism in accordance with the above object which is simple and inexpensive to manufacture and install, and which reduces operating costs by avoiding the necessity of constant maintenance and by avoiding other strains inherent in the type of endless conveyor under consideration.

According to the present invention, the catenary mechanism is incorporated in article-handling apparatus that includes an endless conveyor moving intermittently through one zone and continuously through a second zone, this mechanism itself including a pair of idler sheaves disposed one near the entrance end of the second zone and the other near its exit end. The two zones through which the conveyor must travel are arranged so that the entrance and exit ends of each are in close proximity to the entrance and exit ends of the other, and the two sheaves, which form a part of the catenary mechanism, engage successive portions of the conveyor passing from one zone into the other. In one form of the invention the sheaves are horizontal and are rigidly interconnected by means of a frame, swingably supported so as to pivot about a vertical axis. Further, the normal or running position of the sheaves is such that the sheave between the exit end of the intermittent zone and the entrance end of the continuous zone creates a loop in the conveyor which is of such radius that, when the conveyor section in the intermittently moving zone is arrested, this sheave can be swung to straighten out the loop and provide the necessary length of conveyor to relieve the tension. Simultaneously, the other sheave, i. e. the sheave between the exit end of the continuous zone and the entrance end of the intermittent zone, is swung to create a loop in the conveyor, this swing being through an arc sufficient to take up the slack which otherwise would be produced as the conveyor is fed toward its arrested movement zone. The normal position mentioned above, of course, is the position in which the swinging sheaves lie when both sections of the conveyor are traveling and, if desired, some resilient means may be secured to the swingable frame so as normally to hold the sheave in any desired position.

In another form of the invention, the sheaves are mounted for reciprocatory instead of swinging movement, although the motion is in response to tension created in the conveyor so that the principle in both forms of the invention is the same.

Another important feature of the invention is that the sheaves, in addition to being pivotally or reciprocably mounted, are mounted in what will be referred to as a "floating" manner, the purpose of this mounting also being to relieve excess tension and take-up slack, although this particular tension or slack is not the same as that directly resulting from the intermittent stopping of a portion of the conveyor. Instead the presence of this additional tension or slack results from the use of sprockets to drive the conveyor, as well as the fact that the links in the conveyor are quite large, this latter being true because in the contemplated embodiment of the invention, the links form carriers for clay-transporting molds and consequently, are, at least, as large as the molds.

To obtain a clear understanding of the phenomena producing this tension and slack may require reference to the drawings and a full description will be given subsequently. Generally, however, it may be said that normally unwanted tension and slack is produced in the loop of the conveyor chain that extends from one catenary sheave around the intermittently driven sprocket and back to the other catenary sheave and the reason that such is produced is because the conveyor, in passing around the sheaves and the sprocket has certain portions moving around a greater radius than other portions; the greater radius being the length of the sprocket arms, while the portions between the sprocket arms lie closer to the rotational axis of the sheave. There is a material difference in these radii because, as stated above, the mold-carrying links are quite long and since the links are grasped at each end by separate adjacent sprocket arms, it will be appreciated that the sprocket arms must be quite widely spread apart radially.

Such being the case, there are a number of factors that can produce a change in the length of the loop around these sprockets. Thus, for example, it may be said that if all of the sprocket arms of the three sprockets are rotated to the same degree or, in other words, all sprockets have these arms pointed in identical radial directions, the loop will be a certain length which may be called "X." However, should one of the sprockets be rotated a set amount the loop length "X" must increase or decrease because the path of the conveyor about the rotational axis of the sprocket is not truly circular. In effect, what is happening is that the conveyor is "cutting corners" in its travel about the sprocket and when a corner is "cut" the length of the loop is reduced a certain small but noticeable amount and slack is produced. If the loop length is rigidly set and held so that there is no such slack, then, when the corners are not being "cut," there will be excess tension. In large, heavy, conveyor chains made up of small links, this tension increase can be ignored, but in light conveyors, such as are desirable for intermittent movement, this tension increase may be sufficient to snap the links, or, at least, produce damaging wear.

The present invention avoids this creation of tension and slack due to changing loop length by so mounting at least one of the catenary sheaves that that sheave can move toward and away from the stationary intermittently-driven sprocket. What actually occurs is that the tension created acts to move the "floating" sheave toward the intermittently-driven sprocket, while slack created permits the "floating" sheave to move away from the intermittently-driven sprocket whereupon the loop is lengthened and the slack taken up. In practice, it has been found desirable to provide some means, such as a counterweight, to urge the "floating" sheave away from the stationary intermittently driven sprocket, while a dash-pot arrangement is utilized to retard the floating movement toward the stationary sprocket, such retardation acting to prevent overriding in that direction.

Figure 3:
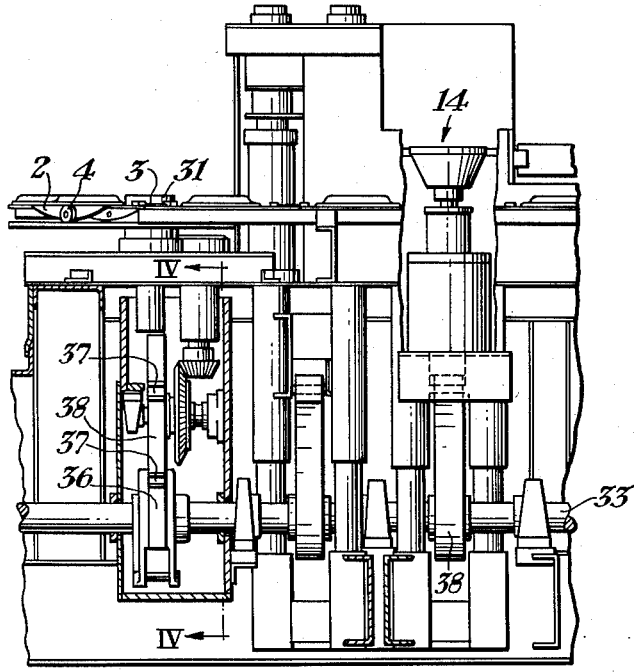
Figure 4:
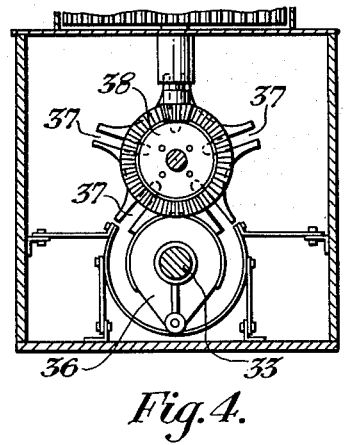
Figure 5:
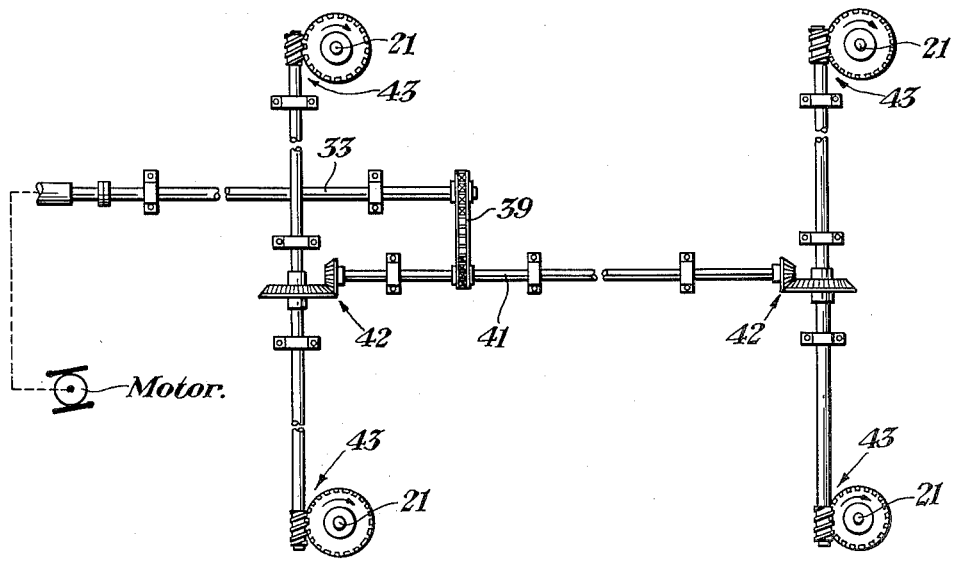
Figure 6:
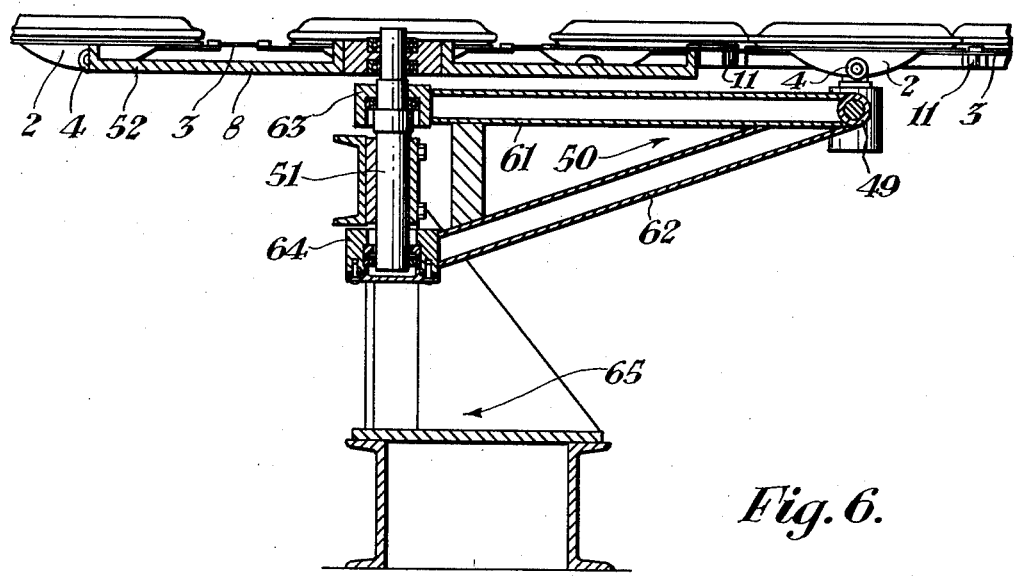
Figure 7:
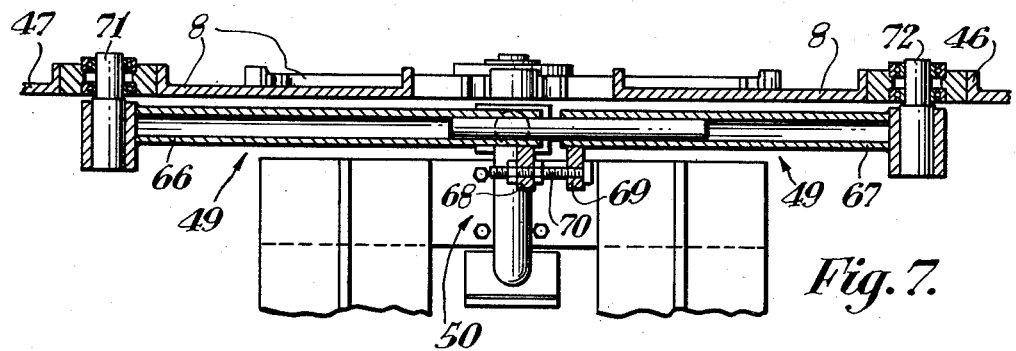
Figure 8:
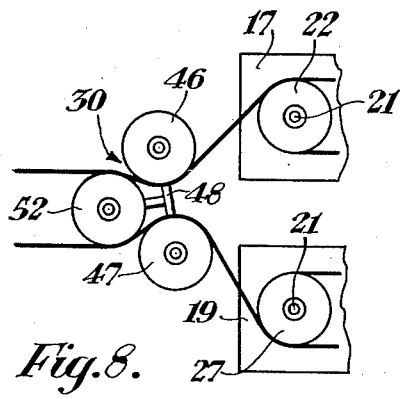
Figure 9:
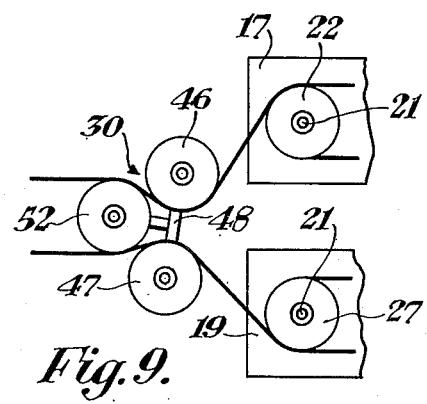
Figure 10:
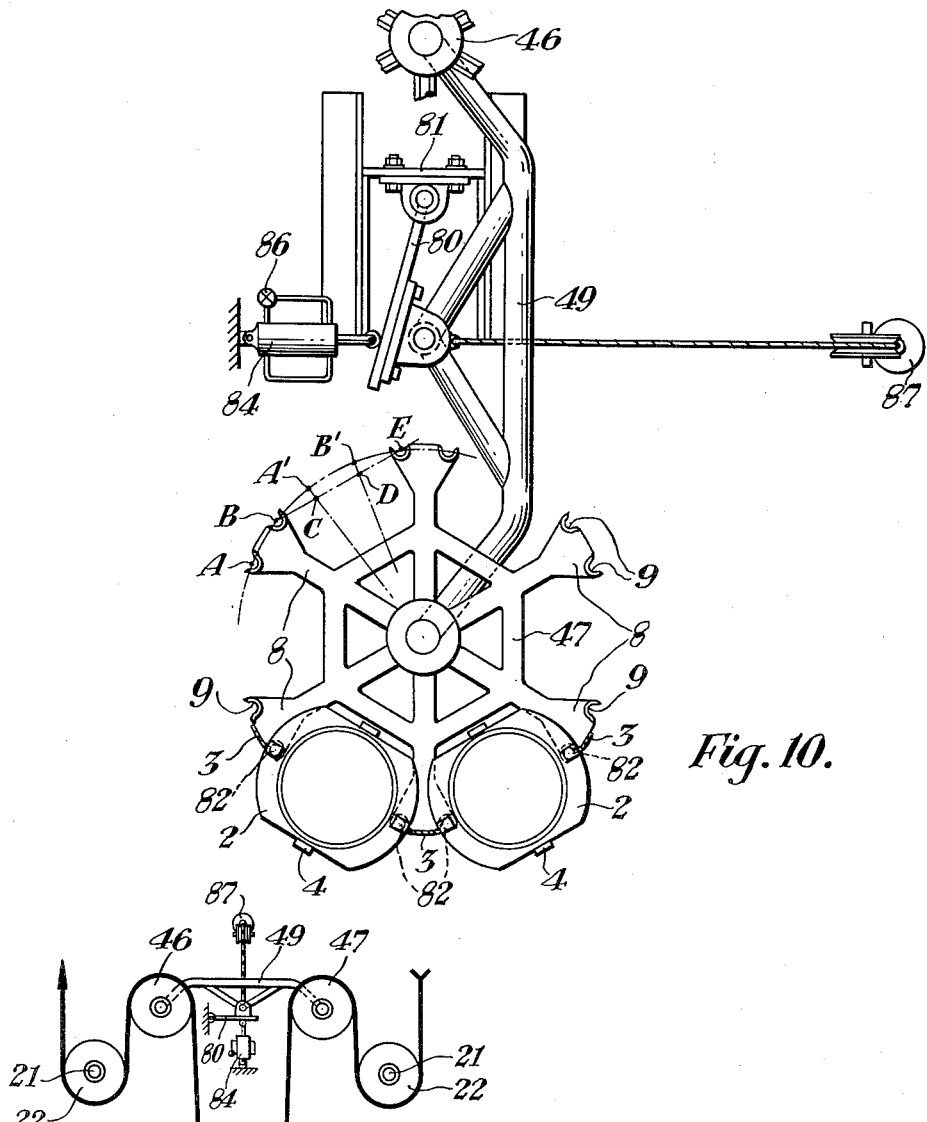
Figure 11:
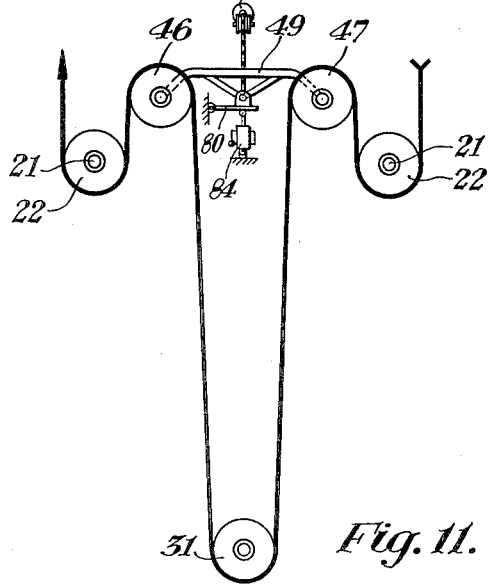
Figure 13:
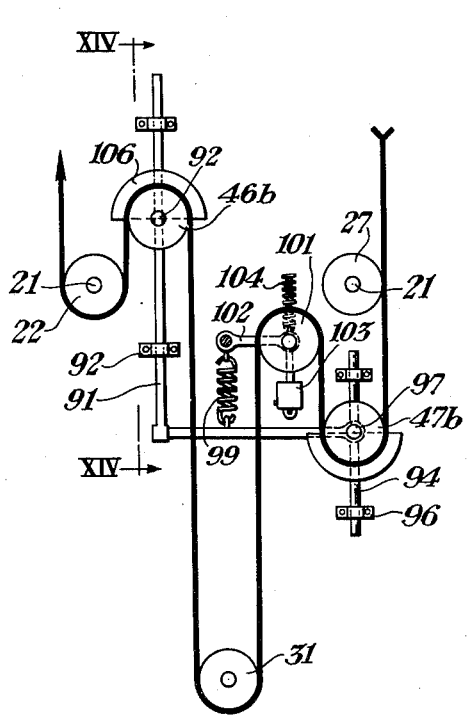
Figure 12:
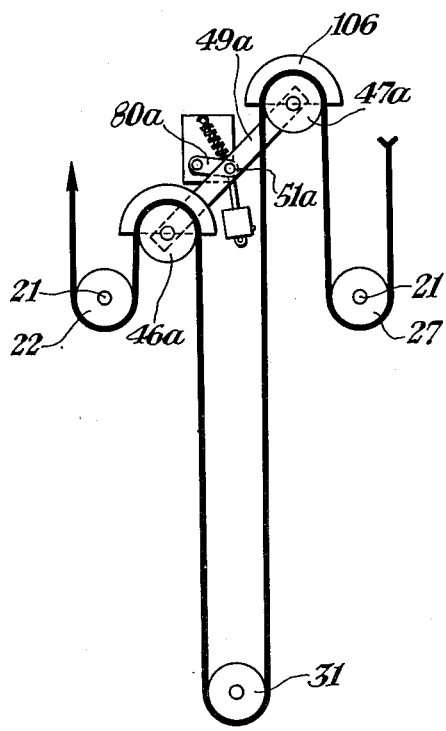

The preferred embodiment of the invention is illustrated in the accompanying drawings of which Fig. 1 is a plan view of one form of the article-handling apparatus, certain portions of the apparatus being broken away so as to more clearly show the path of travel of the conveyor; Fig. 2 is a schematic perspective view showing the path of travel of the conveyor; Fig. 3 a vertical section along line III—III of Fig. 1; Fig. 4 a vertical section taken along line IV—IV of Fig. 3; Fig. 5 a simplified view of the drive for the continuously moving portion of the conveyor; Figs. 6 and 7 vertical sections along lines VI—VI and VII—VII of Fig. 1; Figs. 8 and 9 schematic views showing the operation of the catenary mechanism of Fig. 1; Fig. 10 an enlarged plan view illustrating a particular manner of mounting the catenary sheaves to provide the floating action referred to earlier; Fig. 11 a diagrammatic plan view of the catenary mechanism showing the sheaves mounted as in Fig. 10; Figs. 12 and 13 diagrammatic plan views of two modifications of catenary mechanism and sheave mountings; and Fig. 14 a section along lines XIV—XIV of Fig. 12.

Referring to Figs. 1 to 9, the general arrangement of the article-handling apparatus is illustrated in Figs. 1 and 2 where it may be noted that the invention is applied to pottery ware handling apparatus which includes an endless conveyor 1 made up of a number of mold-carrying trays 2 linked together by short flexible links 3. The actual construction of the conveyor is not a part of this invention so that its details should need no elaboration. Generally, however, mold-carrying trays 2 each mount a pair of rollers 4 which ride on tracks 5 except when the trays are being carried around the several driven sprockets that impart the conveyor motion and direct its course. Preferably, the sprockets each are formed of a plurality of radially extending arms 8, the outer ends of which have notched out surfaces 9 that are adapted to engage with downwardly projecting pins 11 (Fig. 6) carried by the mold trays.

The endless conveyor in its travel, passes through two zones, marked A and B (Fig. 1); the section of the conveyor in zone A being intermittently driven to move the molds up to and away from several ware-forming stations, while the section in zone B is constantly driven through ware-drying bays in which, if desired, artificial drying means, such as heated air blasts, may be used to expedite the drying time. In ware-forming zone A, there are the conventional stations including a feeding station 12 at which a clay batt is dropped onto the mold; a pressing station 13, at which the mold and its clay piece are carried up to a press-head that flattens the clay and imparts to it the initial shape of the ware; and a jiggering station 14 at which the press piece of ware is trimmed by a jiggering tool. Adjacent jiggering station 14 lies a transversely-extending conveyor 15 that carries off the clay trimmed away by the jiggering tool.

Following this ware formation, the clay is dried in zone B which, most advantageously, is rectangular in shape and provided with a number of sprockets arranged in a manner to be described to carry the conveyor first helically upwardly from an entrance end 16 of what may be termed its primary bay 17, and then helically downwardly to an exit end 18 of a secondary bay 19. The sprockets, as may be seen in Figs. 1 and 2, are hub-mounted on driven, vertically mounted shafts 21 which are positioned one at each end of both the primary and secondary bays. Further, each shaft mounts a plurality of sprockets, these being so spaced that the conveyor path is around a lower sprocket 22 disposed adjacent entrance end 16 of primary bay 17, then helically upwardly (Fig. 2) to an upper sprocket 23. From this last sprocket the conveyor passes around an intermediate idler sprocket 24 to an upper sprocket 26 of the secondary bay and then helically downwardly and around a bottom sprocket 27 of this bay cut through the exit end of the drier. Sprocket 27 is disposed adjacent to this exit and, further, it lies in the same horizontal plane as sprocket 22 of the primary bay. It also is desirable to position sprockets 22 and 27 in the same vertical plane and to have them rather close together, these features all improving and simplifying, in a manner to be described, the action of catenary mechanism 30 which lies between ware forming zone A and drying zone B so as to handle the portions of the conveyor successively passing from one zone into the other.

In zone A, the conveyor is intermittently driven while, in zone B the drive is continuous, the intermittent motion being imparted to the conveyor by a sprocket 31 and the continuous motion being imparted by sprockets 22, 23, 26 and 27. Although such simultaneous intermittent and continuous driving of an endless conveyor is not in itself novel, an improvement of the present invention lies in the simplicity by which these drives and the various ware-forming operations are coordinated, as well as the benefits resulting in the use of the particular helical conveyor with the catenary mechanism of the type to be described.

Considering first the driving connections, it is to be noted that a single main motor driven shaft 33 effects both the intermittent and the continuous motion and also that the various cams necessary for initiating the several ware-forming operations are mounted on this shaft. The intermittent motion is produced by a Geneva gear arrangement (Figs. 3 and 4), this apparatus including a cam 36 mounted on shaft 33 and positioned to engage in radial slots 37 of star wheel 38 of the Geneva. The operation of a Geneva drive is well known and, briefly, results from the fact that, upon each rotation of cam 36, the star wheel is rotated a predetermined amount, this rotation being translated to sprocket 31 through a suitable train of bevel gears. The coordination is such that during the intermittent periods of arrested movement of the conveyor, the other ware-forming operations are performed. These operations, also, are initiated and controlled by suitable cams mounted on shaft 33, these being pressing and jiggering station cams 37 and 38, both of which function to control mechanism that lifts the ware-carrying molds from the conveyor and brings the ware into contact with either the press head or the jiggering tool. As a result, coordination of these movements is simply a matter of setting the cams, the intermittent movement as a whole being unusually smooth due to the use of the Geneva.

The continuous drive of the sections of the conveyor in the drier also is taken from main shaft 33, the driving connections here being a chain 39 (Fig. 5) for rotating a jack-shaft 41, this rotation being translated to hub shafts 21, by means of miter gears 42 and worm gears 43, these latter gears rotating the hub shafts which carry the sprockets. It may be noted at this point that with this arrangement the section of the conveyor within the drier is synchronously driven at rather closely spaced points throughout its entire length, and, as will be clearer later, this feature is particularly desirable in connection with the catenary mechanism of the invention because the pull on the conveyor necessary to maintain its tautness is reduced. In other words, by using the numerous, closely spaced and synchronously driven sprockets, the conveyor can be maintained in a taut state without resorting to any great tensioning of the length of the conveyor between the sprockets, this being true because all of the sprockets take up and pay out identical increments of the conveyor, thereby practically eliminating tension from the conveyor strands between sprockets.

Catenary mechanism 30, which forms an important part of this invention, is positioned between zones A and B, of the conveyor and operates both to feed a looped length of conveyor into drying zone B when the conveyor in zone A is stopped, and simultaneously to loop up the length of conveyor feeding out of zone B, this latter loop representing slack which must be taken up to maintain the tautness of the conveyor. Generally considered, the catenary mechanism shown in Fig. 1 and Figs. 6-9 includes a pair of idler sheaves 46 and 47 mounted on a freely swingable frame 48, this frame being formed of a transverse, sheave-connecting arm 49 and a rigid arm-supporting member 50. Member 50 has one of its ends welded, or otherwise integrally secured to the central portion of arm 49 while its other end is swingably supported by a vertical shaft 51 disposed approximately centrally between the exit and entrance ends of zone A of the conveyor. Further, vertical shaft 51 may rotatably mount a third idler sheave 52, all of the idler sheaves of the catenary, i. e. sheaves 46, 47 and 52, being formed with radially-extending, notched arms in the same manner as the other sprocket wheels described previously. The disposition of these sheaves is such that, as mold-carrying trays 2 leave zone A, they immediately are picked up by sheave 52 and delivered to sheave 46, the transfer between these two sheaves being due to the pull on the conveyor exerted by sprocket 22 of the drier conveyor, and the arms of sheave 46 being positioned so as to engage the mold-carrying trays as they are pulled away from sheave 52. Further, sheave 46 is so placed that the mold-carrying trays are pulled tangentially away from it by driven sprockets 22 and radial arms 8 of this sprocket immediately engage the trays as they are so pulled away.

This transfer by the catenary from zone A to sprocket 22 of the drier, of course, results in a pull upon the catenary frame 48 which tends to swing the catenary frame toward sprocket 22, this being the Figs. 1 and 8 position of the catenary frame. However, as this transfer is being effected, mold-carrying trays also are being delivered from the drier and transferred by the catenary mechanism back into zone A, the pull effecting this transfer being that created by sprocket 31 which is the sole source of power for the conveyor in the intermittent zone. This return transfer is from drier sprocket 27 to catenary sheave 47, then around sheave 47 to sheave 52 and back onto the tracks forming the return path of the conveyor in zone A. The relative dispositions of sprocket 27 to sheave 47 and of sheaves 47 and 52 are the same as that described with reference to the transfer into the drier in that, as mold-carrying trays are pulled away from the drier sprocket, they immediately are engaged and constrained to pass around sheaves 47 and 52. This return transfer, it will be appreciated, also creates a pull on catenary frame 48 which tends to swing the sheaves toward drier conveyor sprocket 27 in the secondary bay of the drier (Fig. 9), this pull balancing out the previously mentioned pull on frame 48 toward the primary bay.

Another feature of the catenary mechanism is that, in this balanced, or stationary, position of frame 48, sheave 46 intercepts the conveyor in such a manner that the conveyor must loop around it, this loop being of sufficient radius so that, when the conveyor in zone A stops, frame 48 can swing towards sprocket 22 of the primary bay and feed the loop to this constantly driven sprocket until the conveyor in zone A again resumes its motion. Such a swing toward the primary bay is permitted because there is no pull at this time upon frame 48 toward the secondary bay of the drier, this normal pull ceasing because sprocket 31 is stopped. For an analogous purpose, sheave 47 in its balanced, or stationary, position, also lies in a set position, this position being such that the swinging of frame 48 toward the primary bay causes sheave 47 to swing an amount sufficient to take up the slack produced by the continuously driven conveyor section being fed toward the stopped conveyor section. Of course, when intermittent travel of the conveyor is resumed, rotation of sprocket 31 again creates a pull on frame 48 which returns the frame and its sheaves to the balanced position described above. The swinging to and fro of the catenary frame takes place each time sprocket 31 is stopped, and, it will be recognized, that in event there are variations in the pull in either direction, the frame is capable of swinging through a greater or lesser arc to compensate for the variation. Thus, the catenary is capable of self-adjustment, although it has been found that the use of a spring, such as spring 53 (Fig. 1), is advantageous both to assure tautness of the conveyor about sheave 47 and to render the frame more quickly responsive in its swing toward the primary bay. The operation of the catenary is illustrated by line drawings in Figs. 8 and 9 which, it is believed, are self-explanatory in view of the above descriptions.

The details of construction of the catenary shown in Figs. 1 to 9, can be varied in a number of ways. Its general construction, however, includes, as previously noted, sheave-connecting arm 49, arm-supporting member 50 and vertical shaft 51 on which the arm-supporting member is swingably mounted. Arm-supporting member 50, preferably, is formed of horizontal and inclined braces 61 and 62, both of which are provided with collars 63, 64 by which they are swingably mounted on shaft 51. This shaft is supported in the manner shown (Fig. 6) by a rigid standard 65 and the upper portion of the shaft is reduced in cross-section to rotatably receive idler sheave 52. Also, sheave-connecting arm 49 is formed of a pair of adjustably inter-connected tubular members 66 and 67, member 50 being rigidly secured to either one of those tubular members. The adjustable interconnection of the tubular members is achieved by forming downwardly projecting flanges 68 and 69 on these members, the flanges being connected by an adjustable bolt 70. Sheaves 46 and 47 are rotatably mounted on short hub shafts 71 and 72 carried at the outer ends of these arms, and the adjustability of the arms is for the purpose of altering the position of either of the sheaves so as to obtain as smooth a mold tray transfer action as possible.

Another important feature of the invention already has been described generally and it is a fact that sheave-supporting frame 48 is so mounted that it can float, or move, in a horizontal plane, toward and away from intermittently driven sprocket 31. Such a mounting is illustrated in Fig. 10 where it is seen that sheaves 46 and 47 are rotatably supported on pipe 49 this pipe being swingably, or pivotally supported by an arm 80 which, in turn, also is swingably, or pivotally, carried by stationary supporting framework 81. The result is that pipe 49, which carries the sheaves, is free to swing either toward drier sprocket 22 or sprocket 27 in the manner which will be apparent in Fig. 11. At the same time, any force exerted on the sheaves in or away from the direction of intermittent sprocket 31 will react on frame-supporting arm 80 and cause it to swing and move the sheaves and pipe 49 toward or away from sprocket 31. It is believed a description of the particular manner in which both pipes 49 and arm 80 are swingably mounted is unnecessary since it should be clear to any mechanic of ordinary ability, and, further, since one suitable mounting is illustrated in Fig. 6 and has been described with reference to that figure.

The need for providing such a floating support for the sheaves arises because of the fact that the particular type of conveyor required to transport ware-carrying molds also requires light and small sprockets, or sheaves which, also, as may be noted in Fig. 10, have arms which are spaced rather widely radially about the sprockets. Such a sprocket is shown in Fig. 10 and the reason for the wide spacing of the sprocket arms can be realized readily by consideration of the links of the conveyor moved by the sprockets. Thus, in Fig. 10 there are shown two mold-supporting trays 2 which form rigid links of the conveyor and which are connected together by flexible links 3, these rigid links, customarily, being provided at each end with downwardly projecting pins 82 which are engaged by the sprocket arms in the manner shown, so that, it is apparent that the sprocket arms must be spaced apart a distance substantially equal to the length of rigid links 2. In other conveyors in which the length of the links are smaller in proportion to the circumference of the sprocket, there is little need for the floating mounting of this invention. However, as will be explained presently, where the links are large in proportion to the diameter of the sprocket, there is a real need for it.

The lightness and smallness of the sprockets is another reason for the floating mounting and the sprockets must be relatively light and small because such is a practical necessity when tension in the conveyor is relied upon as the sole means for swinging catenary sheaves 46 and 47. If these sheaves were large and heavy, the tension would not swing or move them quickly enough to compensate for the tension increase or decrease. Consequently it is a practical impossibility to so extend the length of the sprocket arms as to avoid the necessity of the floating mounting.

With sprockets of the type described, the reason for the floating mounting can be appreciated by considering the manner in which the links of the conveyor move about them. Briefly stated, the reason for the mounting is that while the conveyor sprockets are moving at a uniform radial speed there is imparted to the conveyor a varying linear velocity. This phenomenon is illustrated in Fig. 10, on which, it may be noted, are marked points A and B, these points representing the axes of pins 82 of the mold-carrying trays 2. Also, points A' and B' are marked thereon, these points being spaced apart the same distance as points A and B and further, they have the same radial spacing as points A and B. However, the longitudinal axis of the link itself does not travel around the sprocket at the same radius as points A and B but, instead, travels at a radius which can be represented by points C and D, and it should be readily apparent that, as point A moves to point B, a greater distance is traversed than when point C moves to point D; this, of course, being due to the distance in radius between points A and B and points C and D.

With this in mind, it now should be recalled that sprocket sheaves 46 and 47 are swingably, or movably, mounted so that they can travel in the general direction of one or the other of the bays of the drier, and as a result, the location of the centers of these two sheaves contantly varies. The result of these varying centers is that the radial directions, or dispositions, of the arms of sheaves 46 rarely are the same as the dispositions of the arms of sheave 47. Consequently, a condition might arise in which a link is being fed off of sheave 47 at a slower rate than another link which is being picked up by sheave 46, or, for that matter, by intermittent sprocket 31. The result would be a tensioning of the loop formed by the portion of the conveyor between sheaves 46 and 47, and such a tensioning, if not compensated for, results in rapid wear of the parts and undesirable vibration. The floating support for these sheaves compensates for this tensioning by permitting the sheaves, with their supporting frame 48, to move toward intermitted sprocket 31 a sufficient distance to relieve the tension.

At another instant in the traverse of the conveyor, a link might be fed off of sheave 47 at a faster rate than another link being picked up by sheave 46, and in such an event a slackening would be formed in the loop between the sheaves. The floating supports also compensate for this slackening by permitting the sheaves to move in a horizontal direction away from the sprocket. Referring to Fig. 10, these movements toward and away from sprockets 31 are permitted by swingably mounting arm 80.

In practice, it has been found that these sheaves constantly move back and forth with a rather constant frequency and that this floating movement eliminates alternate tightening and slackening of the loop which, otherwise, would result if the floating mounting were not used. Also, because of an apparent tendency for the catenary frame to override when pulled in the direction of sprocket 31, it is desirable to employ means to yieldably resist the movement in that direction, and one such means is hydraulic dashpot arrangement 84, which can be mounted on some stationary portion of the conveyor structure. Preferably, the dashpot is provided with some means, such as a needle valve 86, to permit adjustments in its yieldable resistance to the movement. The movement away from sprocket 31, also, should be assisted by some means such as a counterweight 87, or, if desired, a spring.

As stated, the floating movement is accomplished by means of swinging arm 80. However, it will be readily understood that a slide, or other equivalent device, could be substituted and it would accomplish the same purpose.

Two modified forms of the catenary mechanism of the invention are illustrated in Figs. 12 and 13, these forms being functionally similar to that already described in that they both operate in response to tension created in the conveyor. Fig. 12 shows another form of swinging catenary and it differs from that previously described in that it omits sheave 52 and arm supporting member 50 (Fig. 6) and, instead, simplifies the structure by pivotally mounting a sheave connecting arm 49a at its center point on a vertical shaft 51a, Vertical shaft 51a, in turn, is supported by arm 80 which is swingably mounted on another vertical shaft in the manner indicated. In this form, constant tension in the conveyor is maintained by sheaves 46a and 47a swinging either in the direction of drier sprocket 22 or sprocket 27, while the floating support is provided by the swinging of arm 80 as the loop between the two sheaves tightens or slackens.

Figure 14:
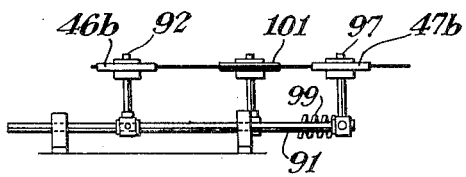

Figs. 13 and 14 present a modification which demonstrates that sheaves 46 and 47 do not necessarily have to pivot, or swing, to relieve tension created by the intermittent driving of sprocket 31; but, instead, this tension can be relieved by a straight line movement of the sheaves. In this modification, sheaves 46b and 47b are interconnected by an L-shaped rod 91 which is reciprocably mounted in bearings 92 (Fig. 14). Sheave 46b is connected to rod 91 by a short vertical shaft 93, and the sheave is rotatably mounted on that shaft. Sheave 47b, however, reciprocates on a separate rod 94 mounted in bearings 95 and the sheave is connected to this rod by a short vertical shaft 97. However, rod 91 is rigidly secured to vertical shaft 97, so that the two sheaves are rigidly interconnected, and, as will be appreicated, move in a straight line together. It will be apparent that the pull created by sprocket 22 when sprocket 31 is stopped moves sheave 46b toward sprocket 22 to relieve the tension, while, at the same time, sheave 47b moves away from sprocket 27 to take up the slack produced by the constant driving of sprocket 27. Movement in the opposite direction takes place when sprocket 31 again is driven, and this movement is assisted by spring 99.

In the modification of Fig. 13, it is necessary to employ an additional sheave, or sprocket, 101 about which the conveyor is looped as it passes over sheave 47b to sprocket 31. The floating support for this modified form may be obtained by swingably mounting sheave 101 on an arm 102, so that, when there is a tightening of the loop between the sheaves, sheave 101 can move toward sprocket 31 to relieve tension. This modification also employs a dashpot 103 and a spring 104 to regulate and assist the floating movement in the manner previously described.

Another feature of the invention which is applicable to all forms described is the mounting of metal plates 106 beneath each of sheaves 46 and 47, as well as sheaves 46a, 47a, etc. The purpose for these sheaves can be appreciated when it is recalled that mold-carrying trays 2 each ride on wheels 4 and, as these trays are carried about the sheaves, it is desirable to provide a surface on which these wheels can ride and provide additional support for the trays. Due to the constant swinging, or moving, of sheaves 46 and 47, it is understandable that, if some means are not provided, the wheels will skid in a lateral direction over their supporting surfaces and this skidding will cause additional wear and instability. To avoid this, plates 106 are securely attached to the frame in a position in which they provide a support, or track, for the wheels and, when the sheaves are swung, the trays swing with them and there is no objectionable lateral skidding.

The advantages of the several catenary mechanisms have been pointed out and, fundamentally, they reside in the provision of an unusually simple construction which functions in an exceptionally smooth manner to relieve conveyor tension and take up conveyor slack; the smoothness of its operation being due to the fact that the amount of its movement is a function of the tension created in the conveyor. A further advantage is that, once this mechanism has been properly installed, there is little need for constant maintenance and adjustments.

Another improvement that has been mentioned briefly lies in the use of the helical drier conveyor with this particular catenary mechanism. The helical conveyor is peculiarly suitable because it is driven by the numerous sprockets which are spaced rather closely together. Consequently, there is little difference in the tension in the conveyor as it enters into the helical drier and its tension as it emerges therefrom. This feature becomes important when it is considered that catenary mechanism 30 operates entirely in response to the tension in the conveyor. By use of the helical conveyor, driven in the manner described, the catenary mechanism is not subjected to large forces operating to pull it in either direction, the beneficial result being that the catenary can move quickly in response to small differential changes in the forces acting upon it. Helical conveyors of this type have other advantageous features in that they have their entrance and exit ends positioned favorably for use with the swinging or reciprocating catenary mechanism, and, also, because their general arrangement conserves much-needed space. From the above it will be recognized that, although the major improvement of the invention is the particular floating catenary machanism, many other features are presented which assure the desired catenary action.

According to the provisions of the patent statutes, I have explained the principle, preferred embodiment and mode of operation of my invention, and have illustrated and described what is now considered to represent its best embodiment. However, I desire to have it understood that, within the scope of the appended claims, the invention may be practiced otherwise than as specifically illustrated and described.

I claim:

1. Article handling apparatus comprising an endless looped conveyor, an intermittently driven sprocket imparting intermittent movement to one portion of the conveyor, a series of continuously driven sprockets imparting continuous movement to the remainder of the conveyor, the first and last of said series being disposed side by side in engagement with the same side of said endless looped conveyor, and catenary mechanism for counteracting variations in conveyor tension caused by the intermittent movement of said portion of the conveyor, said mechanism including a pair of idler sheaves, one of said pair being disposed near said first sprocket and engaging the conveyor between that sprocket and said intermittently driven sprocket and the other being disposed near said last sprocket and engaging the conveyor between that sprocket and said intermittently driven sprocket, and a movably mounted frame supporting and interconnecting said pair of sheaves, said sheave frame being movable alternately toward said first and said last continuously driven sprockets in response to the stopping and starting of said intermittent sprocket, and said frame movement being sufficient to counteract variations in conveyor tension produced by said starting and stopping.

2. Article handling apparatus comprising an endless looped conveyor, an intermittently driven sprocket imparting intermittent movement to one portion of the conveyor, a series of continuously driven sprockets imparting continuous movement to the remainder of the conveyor, the first and last of said series being disposed side by side in engagement with the same side of said endless looped conveyor, and catenary mechanism for counteracting variations in conveyor tension, said mechanism including a pair of conveyor-engaging idler sheaves, one of said pair being disposed near said first sprocket and engaging the conveyor between that sprocket and said intermittently driven sprocket and the other being disposed near said last sprocket and engaging the conveyor between that sprocket and said intermittently driven sprocket whereby a loop is formed between the sheaves passing around said intermittent sprocket, a frame supporting and interconnecting said pair of sheaves, and a movably mounted frame supporting arm, said frame being swingably secured to said arm for movement toward said first and last continuously driven sprockets in response to the stopping and starting of said intermittent sprocket, this swinging movement being sufficient to counteract variations in conveyor tension produced by said starting and stopping, and said frame supporting arm being mounted for movement toward and away from said intermittent sprocket for floatably compensating for changes in the length of the loop between the sheaves whereby constant conveyor tension is maintained.

3. Apparatus in accordance with claim 1, in which said frame also is movable toward and away from said intermittent sprocket for floatably compensating for variations in the length of the portion of the conveyor lying between said pair of sheaves.

4. Apparatus in accordance with claim 1, wherein the halting of said intermittently driven sprocket produces an increase in the tension of the length of the conveyor lying between the intermittent sprocket and said first sprocket and also produces a slack in the conveyor length lying between said last sprocket and the intermittent sprocket, said sheave frame moving toward said first sprocket when said intermittent sprocket stops for counteracting said tension increase and taking up said slack, said sheave frame also returning toward said last sprocket when intermittent motion is resumed, and including resilient means yieldably resisting said return movement.

5. Apparatus in accordance with claim 1, in which said frame also is movable toward and away from said intermittent sprocket for floatably compensating for variations in the length of the portion of the conveyor lying between said pair of sheaves, and including means yieldably resisting the movement of said frame toward said intermittent sprocket.

6. Apparatus in accordance with claim 1, including an article-supporting track beneath each movable sheave, said tracks being carried by said frame for movement with said sheaves.

7. Article handling apparatus comprising an endless looped conveyor, an intermittently driven sprocket imparting intermittent movement to one portion of the conveyor, a series of continuously driven sprockets imparting continuous movement to the remainder of the conveyor, the first and last of said series being disposed side by side in engagement with the same side of said endless looped conveyor, and catenary mechanism for counteracting variations in conveyor tension caused by the intermittent movement of said portion of the conveyor, said mechanism including a pair of idler sheaves, one of said pair being disposed near said first sprocket and engaging the conveyor between that sprocket and said intermittently driven sprocket and the other being disposed near said last sprocket and engaging the conveyor between that sprocket and said intermittently driven sprocket, and a movably mounted frame supporting and interconnecting said pair of sheaves, said sheave frame being movable alternately in opposite directions in response to the stopping and starting of said intermittent sprocket to move either sheave toward the nearer of said first and last sprockets and simultaneously move the other sheave away from the other of said first and last sprockets, and said frame movement being sufficient to counteract variations in conveyor tension produced by said starting and stopping.

8. Apparatus in accordance with claim 7, in which a third idler sheave is disposed between said pair of frame-supported idler sheaves, and said conveyor is looped about said third sheave which is mounted for movement toward and away from said intermittent sprocket for floatably compensating for variations in the length of the portion of the conveyor lying between said pair of idler sheaves.

WILLIAM C. MILLER.

References Cited in the file of this patent

UNITED STATES PATENTS

| Number | Name | Date |
|---|---|---|
| 1,488,251 | House | Mar. 25, 1924 |
| 1,489,167 | Spiess | Apr. 1, 1924 |
| 1,736,517 | Baker | Nov. 19, 1929 |
| 2,240,214 | Heidelmeyer | Apr. 29, 1941 |
| 2,349,292 | Miller et al. | May 23, 1944 |
| 2,437,702 | Miller | Mar. 16, 1948 |
| 2,452,858 | Miller | Nov. 2, 1948 |